US008189515B2

(12) United States Patent
Kangas

(10) Patent No.: US 8,189,515 B2
(45) Date of Patent: *May 29, 2012

(54) METHOD AND APPARATUS FOR IMPROVING RADIO SPECTRUM USAGE AND DECREASING USER DATA DELAY WHEN PROVIDING PACKET PSI STATUS

(75) Inventor: Antti O Kangas, Oulu (FI)

(73) Assignee: QUALCOMM Incorporated, San Diego, CA (US)

( * ) Notice: Subject to any disclaimer, the term of this patent is extended or adjusted under 35 U.S.C. 154(b) by 1387 days.

This patent is subject to a terminal disclaimer.

(21) Appl. No.: 11/508,475

(22) Filed: Aug. 22, 2006

(65) Prior Publication Data

US 2006/0280144 A1    Dec. 14, 2006

Related U.S. Application Data

(63) Continuation of application No. 10/004,477, filed on Oct. 23, 2001, now Pat. No. 7,136,363.

(60) Provisional application No. 60/260,599, filed on Jan. 9, 2001.

(51) Int. Cl.
*H04W 4/00* (2009.01)

(52) U.S. Cl. .................. 370/329; 370/341; 370/350

(58) Field of Classification Search .......... 370/310–350; 455/436–438
See application file for complete search history.

(56) References Cited

U.S. PATENT DOCUMENTS

| 6,104,929 | A | 8/2000 | Josse et al. |
| 6,148,197 | A | 11/2000 | Bridges et al. |
| 6,151,602 | A * | 11/2000 | Hejlsberg et al. ..................... 1/1 |
| 6,628,946 | B1 | 9/2003 | Wibereg et al. ............... 455/434 |
| 6,816,881 | B1 | 11/2004 | Mohindra et al. ............ 709/203 |
| 7,003,115 | B1 * | 2/2006 | Suzuki et al. ................. 380/270 |
| 2001/0004767 | A1 * | 6/2001 | Gordon et al. .................. 725/87 |
| 2003/0005489 | A1 | 1/2003 | Gray et al. |
| 2003/0054809 | A1 * | 3/2003 | Bridges et al. ................ 455/419 |

FOREIGN PATENT DOCUMENTS

| EP | 0898438 A2 | 2/1999 |
| EP | 0996304 A1 | 4/2000 |
| WO | WO9832304 A2 | 7/1998 |
| WO | WO9859468 A2 | 12/1998 |
| WO | WO9934635 A2 | 7/1999 |
| WO | WO9966740 A2 | 12/1999 |

(Continued)

OTHER PUBLICATIONS

"Correction to Packet PSI Status procedure and message encoding", Nokia, Ericsson, Jan. 15-19, 2001.*

(Continued)

*Primary Examiner* — Habte Mered
(74) *Attorney, Agent, or Firm* — Mary A. Fales

(57) ABSTRACT

A method provides for operating a wireless communication system having packet data capabilities, and includes steps of: (a) sending a message from a mobile station to a network on a same physical channel that is used to transmit packet data, the message specifying individual ones of packet system information (PSI) messages that are required for reception by the mobile station; and (b) in response to receiving the message, transmitting only the specified individual ones of the PSI messages from the network to the mobile station over the same physical channel used to transmit the packet data.

8 Claims, 4 Drawing Sheets

FOREIGN PATENT DOCUMENTS

| | | |
|---|---|---|
| WO | WO0044191 A1 | 7/2000 |
| WO | WO-00/79808 A2 | 12/2000 |

OTHER PUBLICATIONS

European Search Report—EP07100420—Search Authority—Munich—Jul. 20, 2009.

"Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol 3GPP TS 04.60 version 6.10.0 Release 1997)" Global System for Mobile Communications, GSM; XP-002215989, ETSI TS 101 349, v6.10.0, 2000, pp. 1-221.

ETSI TS 101 349 V6.10.0, Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol; Oct. 1, 2000, 3GPP TS 04.60 v6. 10.0, pp. 1-221.

International Search Report, PCT/IB02/000010—International Search Authority—European Patent Office, Oct. 25, 2002.

\* cited by examiner

CONSISTENT SETS OF SYSTEM INFORMATION MESSAGES

| CONSISTENT SET/ MESSAGE TYPE(s) | BROADCAST CHANNEL | NUMBER OF INSTANCES | PSI OR SI CHANGE MARK PARAMETER | PSI OR SI INDEX PARAMETER | PSI OR SI COUNT PARAMETER |
|---|---|---|---|---|---|
| PSI2 | PBCCH | 1-8 | PSI2 CHANGE MARK | PSI2 INDEX | PSI2 COUNT |
| PSI3 | PBCCH | 1 | PSI3 CHANGE MARK | | |
| PSI3 bis | PBCCH | 1-16 | PSI3 CHANGE MARK | PSI3bis INDEX | PSI3bis COUNT |
| PSI4 | PBCCH | 0-8 | PSI4 CHANGE MARK | PSI4 INDEX | PSI4 COUNT |
| PSI5 | PBCCH | 0-8 | PSI5 CHANGE MARK | PSI5 INDEX | PSI5 COUNT |

PSI3 AND PSI3bis TOGETHER FORM A CONSISTENT SET

OPTIONAL MESSAGES

FIG.2

```
<Packet PSI Status message content> ::=
  <GLOBAL_TFI: <Global TFI IE > > >
  <PSCCH_CHANGE_MARK: bit (3) > >
  <Received PSI Message List: <PSI Message List struct >>
  <Received Unknown PSI Message List: <Unknown PSI Message List struct >>
  <padding bits >;

<PSI Message List struct> ::=
  { 1 < MESSAGE_TYPE: bit (6) >
      < PSIX_CHANGE_MARK: bit (2) >
      {0 | 1< PSIX_COUNT: bit (4) >
           <Instance bitmap: bit(val (PSIX_COUNT) + 1)>}}**0
  <ADDITIONAL_MSG_TYPE: bit >;

<Unknown PSI Message List struct> ::=
  { 1 < MESSAGE_TYPE: bit (6) > **} 0
  <ADDITIONAL_MSG_TYPE: bit >;
```

FIG.4

METHOD AND APPARATUS FOR IMPROVING RADIO SPECTRUM USAGE AND DECREASING USER DATA DELAY WHEN PROVIDING PACKET PSI STATUS

CROSS REFERENCE TO RELATED APPLICATION

This Application is a continuation of and claims the benefit of U.S. patent application Ser. No. 10/004,477 filed on Oct. 23, 2001 now U.S. Pat. No. 7,136,363 and claims the benefit of U.S. Provisional Application No. 60/260,599 filed Jan. 9, 2001.

FIELD OF THE INVENTION

This invention relates generally to wireless communication devices and methods and, more particularly, relates to wireless terminals, networks and systems for communicating packet data over radio channels.

BACKGROUND OF THE INVENTION

The following terms are used in the ensuing description, and are defined as follows:
  GSM Global System for Mobile Communications, a digital wireless communication system using a Time Division Multiple Access (TDMA) air interface.
  GPRS General Packet Radio Service, a GSM phase 2+ service in which radio resources for data transfer are allocated on a per block basis, as opposed to a circuit-switched basis.
  MS Mobile Station, such as a handheld cellular telephone, a vehicle-installed cellular telephone, a personal communication device, a personal data assistant (PDA) device having wireless communication capabilities, a wireless communication module installable within or with a computer, such wireless communication module installable within or with a computer, such as by plugging into a PCMCIA slot and, in general, any device capable of bidirectional communication with a wireless network.
  DL Downlink: a direction from the wireless network to the MS.
  UL Uplink: a direction from the MS to the wireless network.
  PSI Packet System Information (message).
  PBCCH Packet Broadcast Control Channel: a downlink channel used to broadcast PSI messages.
  PACCH Packet Associated Control Channel: a logical channel that is used to send control blocks between the network and the MS on the same channel that packet data blocks are sent (i.e., during packet data transfer)
  TBF Temporary Block Flow: a temporary flow of packet data from the MS to the network (UL TBF) or from the network to the MS (DL TBF). If the direction is not specified, TBF means UL TBF, DL TBF, or both.
  PTM Packet Transfer Mode: a mode wherein the MS is receiving packet data, sending packet data, or both, that is, the MS has UL TBF, DL TBF, or both UL and DL TBFs active.
  Multi-RAT Multi-Radio Access Technology: a MS having both 2G (GSM) and 3G (UMTS) capabilities, e.g., 2G-3G multimode phone that can obtain service in either a 2G or a 3G network.

During the initial acquisition of PSI messages, for example after cell (re)selection, the network does not necessarily know which PSI messages it needs to send to the MS. This problem will become more prominent in future releases (e.g., those coming after Release 1997 (R97), Release 1998 (R98 and Release 1999 (R99)), as new PSI messages will be introduced. As presently specified, a given MS is not able to inform the network as to which PSI messages it expects to receive from the network.

More specifically, during an Unspecified Update procedure the MS is required to receive at least one instance of each PSI message type. Currently, the Packet PSI Status message is not specified so as to indicate which PSI message type(s) the MS requires in order to perform change mark checking. As such, the currently specified Packet PSI Status procedure cannot be used during a partial acquisition procedure.

OBJECTS AND ADVANTAGES OF THE INVENTION

It is a first object and advantage of this invention to provide an improved packet data procedure that overcomes the foregoing and other problems.

It is another object and advantage of this invention to provide an ability for the MS to indicate to the network which PSI messages it requires from the network.

SUMMARY OF THE INVENTION

The foregoing and other problems are overcome and the foregoing objects and advantages are realized by methods and apparatus in accordance with embodiments of this invention.

In accordance with the teachings herein the MS is enabled to expressly inform the network as to which PSI messages it is required to receive and, in response, the network is enabled to send the MS only those PSI messages that it requires. As a result, there is a better utilization of the spectrum of the packet data channels, and data throughput also increases.

A further benefit that results is that the MS is not required to suspend an ongoing packet transfer during the Unspecified Update procedure, thereby further increasing data throughput. Also, since the TBF is not required to be suspended, the spectrum is more fully utilized and allocated more efficiently, since during a conventional TBF suspension data blocks cannot be sent or received for the duration of each PBCCH block, as well as for the surrounding blocks, due to channel configuration delays and required settling times in the MS Digital Signal Processor (DSP).

A further advantage of these teachings is that currently specified signaling procedures are used, thereby avoiding a requirement to specify new signaling procedures.

A method in accordance with these teachings provides for operating a wireless communication system having packet data capabilities, and includes steps of: (a) sending a message from a mobile station to a network on a same physical channel that is used to transmit packet data, the message specifying individual ones of packet system information (PSI) messages that are required for reception by the mobile station; and (b) in response to receiving the message, transmitting only the specified individual ones of the PSI messages from the network to the mobile station over the same physical channel used to transmit the packet data.

In a presently preferred, but not limiting, embodiment the message is a PACKET PSI STATUS message, and the physical channel conveys a Packet Associated Control Channel (PACCH). The steps of sending the message and transmitting the PSI messages occur during a packet data transfer mode and without suspending an established Temporary Block Flow (TBF). In the presently preferred embodiment the mobile station fills the Packet PSI Status message by including (optional) fields PSIx_COUNT and Instance_Bitmap, and by setting their respective fields to zero for the particular PSI message type in the PACKET PSI STATUS message. In response, the network determines that the mobile station has not received the particular PSI message type, and disregards an indicated PSI_CHANGE_MARK in the PACKET PSI STATUS message.

Further in accordance with these teachings is a method for operating a wireless communication system having packet data capabilities. The method includes sending a PACKET PSI STATUS message from a mobile station to a network, the PACKET PSI STATUS message specifying individual ones of packet system information (PSI) message types that are required for reception by the mobile station and, in response to receiving the PACKET PSI STATUS message, sending only the specified individual ones of the PSI message types' from the network to the mobile station. Sending the PACKET PSI STATUS message includes indicating mobile station-supported PSI message types in a Received PSI Message List in the PACKET PSI STATUS message. The mobile station may indicate in the PACKET PSI STATUS message, for each PSI message type for which the mobile station desires a PSI CHANGE MARK value, the present status of the PSI message type and that the PSI message type has not been received. In this case the mobile station may desire the PSI CHANGE MARK value at least during a partial acquisition of PSI messages.

The PSI message types that are required for reception by the mobile station are those meeting the following criteria: a) those PSI message types that the mobile station considers relevant based on the features that the mobile station supports; and b) for optional PSI message types, the PSI message type has been indicated by the network as present on a Packet Broadcast Control Channel (PBCCH).

BRIEF DESCRIPTION OF THE DRAWINGS

The above set forth and other features of the invention are made more apparent in the ensuing Detailed Description of the Invention when read in conjunction with the attached Drawings, wherein:

FIG. 2 shows consistent sets of system information messages;

FIG. 4 shows the PACKET PSI STATUS message information elements.

DETAILED DESCRIPTION OF THE INVENTION

Figure 1:
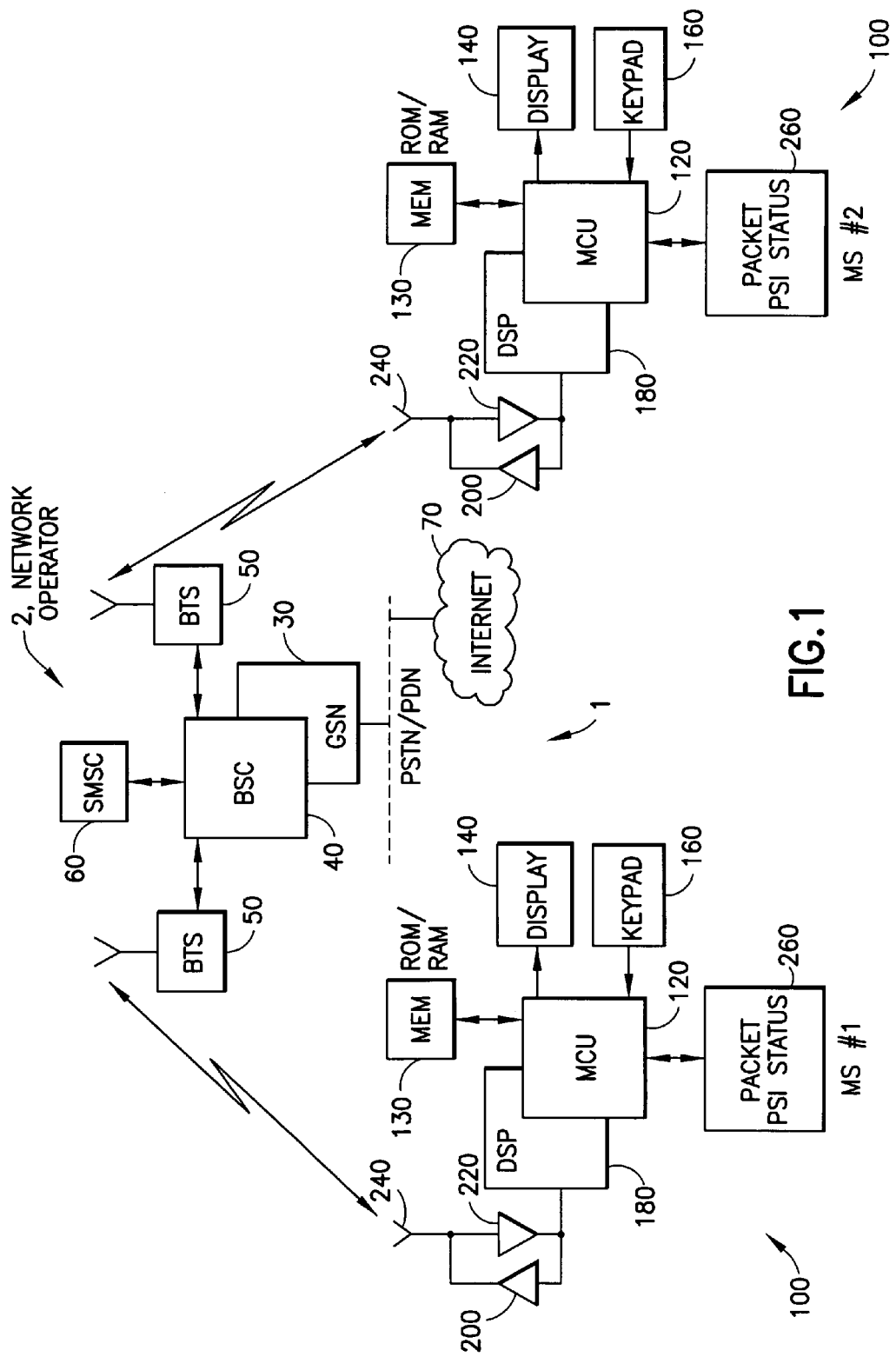
FIG. 1 is simplified block diagram of a wireless communication system that is suitable for practicing the teachings in accordance with this invention.

Referring first to FIG. 1, there is illustrated a simplified block diagram of an embodiment of a wireless communications system 1 that is suitable for practicing this invention. The system 1 is assumed to include a plurality of mobile stations 100. Two mobile stations (MSs 100) are shown in FIG. 1 for convenience, with one being designated MS#1 and the other MS#2. FIG. 1 also shows an exemplary wireless communications network 2 operated by a network operator having, for example, a GPRS Support Node (GSN) 30 for connecting to a telecommunications network, such as the Public Switched Telephone Network (PSTN) and/or a Public Packet Data Network (PDN), at least one base station controller (BSC) 40, and a plurality of base transceiver stations (BTS) 50 that transmit in a forward or downlink (DL) direction both physical and logical channels to the mobile stations 100 in accordance with a predetermined air interface standard. A reverse or uplink (UL) communication path also exists from the mobile station 100 to the network 2, which conveys mobile originated access requests and traffic. Each BTS 50 can be assumed to support a cell within which one or more of the MSs 100 may be located. The MS 100 and the network 2 employ the improved PSI procedure in accordance with these teachings, as described in further detail below.

In a preferred, but not limiting, embodiment of these teachings, the air interface standard can conform to any standard that enables packet data transmissions to occur with the mobile stations 100, such as Internet 70 access and web page downloads. In the presently preferred embodiment of this invention the air interface standard is a Time Division Multiple Access (TDMA) air interface that supports the enhanced GPRS capabilities disclosed herein.

The network operator 2 may also include a System Message Service Center (SMSC) 60 that receives and forwards messages for the mobile stations 100, although any wireless messaging technique that is capable of using packet data can be used. Other types of messaging service may include Supplementary Data Services and one under currently development and known as Multimedia Messaging Service (MMS), wherein image messages, video messages, audio messages, text messages, executables and the like, and combinations thereof, can be transferred between a network and a mobile station.

The mobile station 100 typically includes a microcontrol unit (MCU) 120 having an output coupled to an input of a display 140 and an input coupled to an output of a keyboard or keypad 160. The mobile station 100 may be considered to be a handheld radiotelephone, such as a cellular telephone or a personal communicator. The mobile station 100 could also be contained within a card or module that is connected during use to another device. For example, the mobile station 100 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. The memory 130 is also assumed to store PSI messages, as described in further detail below. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the transmission and reception of packet data in accordance with the teachings herein, as well as to provide a suitable user interface (UI), via display 140 and keypad 160, with a user. Although not shown, a microphone and speaker are typically provided for enabling the user to conduct voice calls in a conventional manner. A Packet PSI Status processing module, that operates in accordance with this invention, is shown generally as the block 260, although this functionality will in practice typically be embodied by program instructions stored within the memory 130.

The mobile station 100 also contains a wireless section that includes a DSP 180, or equivalent high speed processor, as well as a wireless transceiver comprised of a transmitter 200 and a receiver 220, both of which are coupled to an antenna 240 for communication with the network 2. Packet data is transmitted and received through the antenna 240, in accordance with the teachings herein.

Having thus described a suitable embodiment of a wireless communications network 2, mobile station 100 and overall system 1 for practicing this invention, a more description of this invention is now provided.

These teachings provide a method for using existing procedures and messages to handle various types of PSI message acquisitions during the packet data transfer mode. These PSI message acquisitions include an initial acquisition, wherein for a first time the PSI messages are received by the MS 100. In this case a problem is presented that the network 2 does not know which PSI messages to send to the MS 100. This is especially the case in R99 and newer networks for which several optional PSI message types have been defined. The PSI message acquisitions also include the case of an update specified by the network 2 in a PSI_CHANGE_FIELD in a PSI1 message, wherein a set of messages are explicitly defined and an Unspecified Update is commanded.

In order to gain a better understanding of the present invention and the benefits conferred by the use thereof, a description will be first be made of the current PSI message usage, and the problems that result from the currently specified PSI message procedure.

In the GPRS the system information concerning packet access parameters is broadcast as PSI messages if the cell supports a control channel dedicated to GPSR (PBCCH). In this case the MS 100 is expected to receive all broadcast PSI messages.

Reference is now made to FIG. 2 for showing various exemplary types of PSI messages. If a PBCCH is present in a cell, the network 2 regularly broadcasts Packet System Information (PSI) type messages on the PBCCH. The PSI2 and PSI3bis messages, and some further types of PSI messages, may be broadcast in some multiple numbers of instances. Based on the information broadcast in PSI messages, the MS 100 is enabled to determine whether and how it may gain access to the network 2 via the current cell.

If multiple instances of a PSI message type are sent on the PBCCH the MS 100 is expected to receive a consistent set of that type of PSI (or System Information (SI)) message. In some cases more than one type of PSI message may be joined into one consistent set, as shown in FIG. 2. As an example, all instances (1-8) of the PSI2 message form a consistent set.

Figure 3:
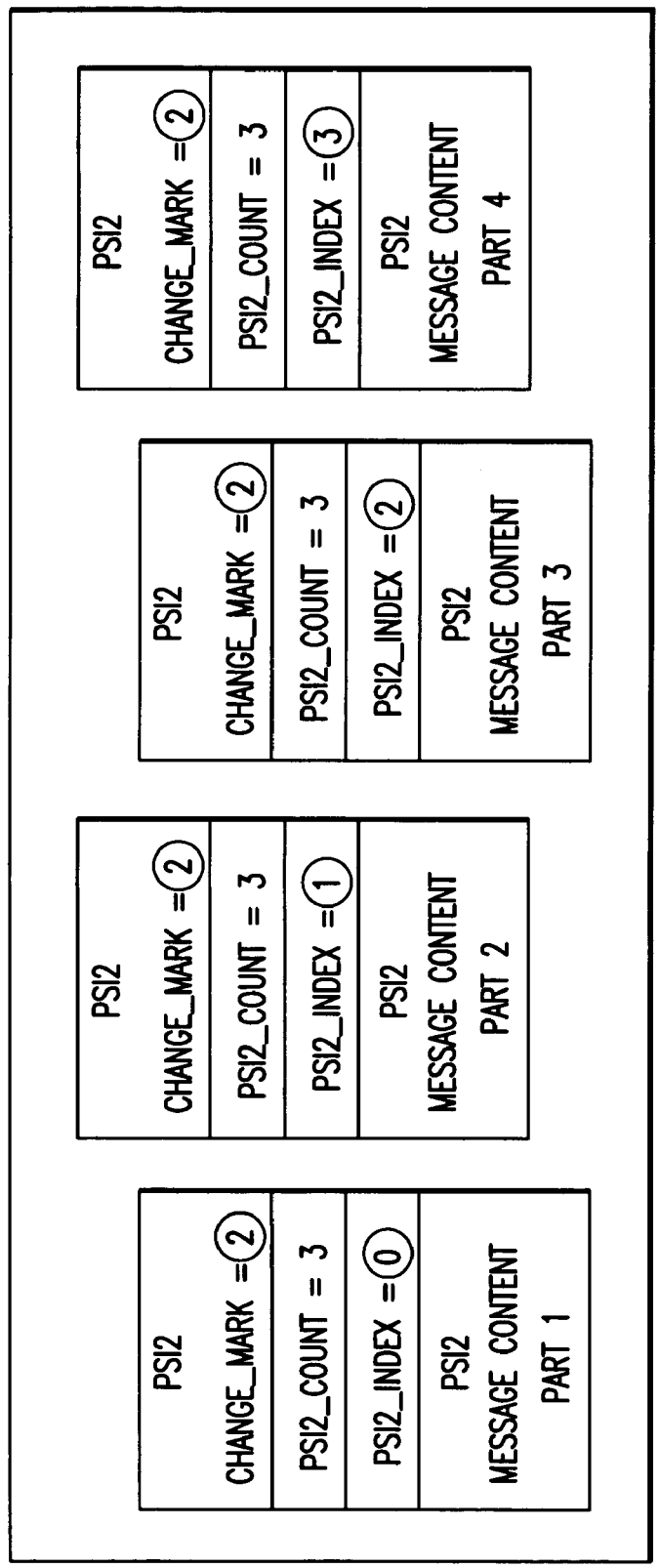
FIG. 3 presents an example of a PSI message with several instances, in this example PSI2=four instances, PSI2_CHANGE_MARK=2.

Referring now to FIG. 3, a consistent set of system information messages is identified by a PSI_Change_Mark parameter that is included in each message in the set. All PSI messages within a consistent set are specified to have the same value of the PSI_Change_Mark parameter.

The total number of system information messages of a certain type within a consistent set is indicated by a PSI_Count parameter that is included in each PSI message of the set. The position of a certain message instance within the consistent set of system information messages is indicated by a PSI_Index parameter.

The PSI_Count parameter has the value of N−1, where N is the number of instances of the particular message type present in the consistent set. The PSI_Index parameter has a range from zero to N−1. Different instances of a particular message type in a consistent set have different values of the PSI_Index parameter.

FIG. 3 shows an example of a PSI message with several instances: PSI2, four instances, PSI2_CHANGE_MARK=2. Note should be made of the same PSI_Change_Mark values, as well as the increasing PSI_Index values.

With regard to change mark handling, the PSI1 contains a change mark for the entire set of PSI messages (PBCCH_CHANGE_MARK). This change mark is stored in the memory 130 of the MS 100 and used for subsequent comparisons. The PSI1 is refreshed every 30 seconds regardless of whatever activities the MS 100 is performing. The PSI1 may indicate that some PSI messages are to be refreshed (i.e., received again) by the MS 100. This refresh indication (parameters PBCCH_CHANGE_MARK and PSI_CHANGE_FIELD) may be given in the following two ways. The first technique is that the PBCCH_CHANGE_MARK value is increased by two or more. In this case the MS 100 is required to receive all PSI messages again. The second technique increases the PBCCH_CHAGE_MARK value by one, which indicates that the MS 100 is required to check the value of the associated parameter PSI_CHANGE_FIELD. This parameter may indicate that: (a) the MS 100 is to begin an update of a specific type of PSI message; (b) that the MS 100 is to begin an update of an unspecified type of PSI message(s); or (c) that the MS 100 is to begin an update of an unknown type of PSI messages (for future extensions, in this case the MS 100 need not refresh any PSI messages).

In any case, except for the unknown update case, the MS 100 is expected to receive and check the change mark of at least one instance of each PSI message type specified by the PSCCHANGE]IELD. If the change mark has a different value than the one stored in the memory 130, the MS 100 is to delete the stored PSI message set and begin reacquiring that particular PSI message set.

With regard to PSI message acquisition, if the MS 100 is in the packet transfer mode when PSI acquisition is required, the MS 100 suspends the TBF(s) for enabling PSI reception on the PBCCH. The PBCCH is located in a different physical channel (i.e., in a different downlink frequency), which implies that the MS 100 must switch to the PBCCH from the actual packet data physical channel. Since the DSP 180 is not able to switch instantly between physical channels, the data transfer must be interrupted. Some amount of channel settling time must also be provided. Furthermore, in the GPRS system all data blocks are sent in four consecutive radio bursts, which means that the MS 100 misses a complete data block even if only one burst is missed. When suspending the TBF this is typically the case. As such, for each PBCCH block the MS 100 misses three packet data blocks (one corresponding to the actual received PBCCH block as well as the two blocks surrounding it.) This can seriously impede the data traffic, as there may be many PSI messages with multiple instances.

Also, the number of PBCCH blocks per multiframe (a network 2 configuration parameter) may be up to four. As such, the TBF suspension may lead to a complete halt in packet data traffic for the duration of the suspension.

Furthermore, the suspension case may be even more onerous if the PSI message reception is not optimized (i.e., PSI messages are not received accurately).

The GPRS system as presently specified provides for a PACKET PSI STATUS message which, if supported by the network 2, means that the network 2 is enabled to support the sending of PSI messages to the MS 100 on the Packet Associated Control Channel (PACCH). As defined above, the PACCH is a logical channel that is used to send control blocks between the network 2 and the MS 100 on the same (physical) channel that the packet data blocks are sent. In this case, the packet data transfer is only interrupted for those PSI message blocks sent on the PACCH, and the TBF is not required to be suspended for receiving PSI messages from the PBCCH.

Further in this regard, in the uplink direction (PACCH/U) is a point-to-point connection, whereas PACCH in the downlink direction (PACCH/D) is point-to-point or point-to-multipoint, depending on the MSs 100 configured on the PDCH. Most typically, in the downlink direction PDCH is shared by a plurality of MSs 100, and since PSI messages are broadcast data, the PSI messages are valid for a plurality of the MSs 100. Since there will typically be a number of MSs 100 sharing the downlink PDCH, the teachings of this invention help these mobiles as well (in the case that there is a downlink TBF active for them), since the shared downlink PDCH is not required to convey unnecessary PSI messages.

The support of the PACKET PSI STATUS is optional for both the MS 100 and the network 2. However, due at least to the fact that PACKET PSI STATUS message support in the network 2 reduces the cell reselection delay, the eventual wide-spread support for this optional feature is expected, especially in light of the fact that in GPRS R99 new PSI message types with multiple instances have been specified. This can be expected to increase even further the cell reselection times. Furthermore, future versions of the GPRS specification are expected to provide for additional information to be broadcast on the PBCCH, as well as information that can be expected to change frequently (e.g., location services, assistance data, advertisements, etc.) These various factors can be expected to drive the GPRS specification in the direction of requiring a flexible, accurate and frequent ability to refresh PSI messages.

As is presently specified (GSM TS 04.60, Release 1997 (version 6.10.0) and Release 1999 (version 8.6.0)) for the PACKET PSI STATUS message (paragraph 5.5.1.2):

"5.5.1.2 System information on PBCCH

If the PBCCH is present in the serving cell, the mobile station shall receive the PACKET SYSTEM INFORMATION (PSI) messages broadcast on the PBCCH. The parameters determining the schedule of PSI messages on PBCCH are provided in the PSI1 message.

When a new cell has been selected where PBCCH is present, the mobile station shall perform a complete acquisition of the PBCCH messages (see 5.5.1.4). The mobile station shall not perform packet access in the selected cell, or enter the packet transfer mode, until it has:

acquired the PACKET SYSTEM INFORMATION TYPE 1 (PSI1) message;

acquired a consistent set of PSI2 messages; and made at least one attempt to receive the complete set of PSI messages on PBCCH.

As an option, if the network supports the PACKET PSI STATUS message, the mobile station may perform packet access, and enter packet transfer mode, as soon as the PSI1 message and a consistent set of PSI2 messages have been received. In this case, the mobile station shall implement the request for acquisition of system information (see 5.5.1.4.3)."

Due to the fact that there may be many PSI messages (which is certain to be the case in later releases of GPRS), the cell reselection delay (during which time the user's packet data cannot be sent or received) can be significantly reduced using the PACKET PSI STATUS message.

However, the inventor has recognized that certain problems exist in the use of the PACKET PSI STATUS message as presently specified. For example, the specification states for the PACKET PSI STATUS message (04.60, paragraph 5.5.1.4.3):

5.5.1.4.3 Request for acquisition of system information

"As an option, the mobile station may implement the request for acquisition of system information, if the network supports the PACKET PSI STATUS message, the mobile station may then send the PACKET PSI STATUS message to the network, each time an acquisition of PBCCH information is initiated.

The PACKET PSI STATUS message shall indicate the present status of the PSI messages stored in the mobile station. The PACKET PSI STATUS message is sent on the PACCH when the mobile station is in the packet transfer mode. The first sending of this message during the acquisition of PBCCH information shall take place at the first suitable opportunity after the acquisition is initiated."

The content of the PACKET PSI STATUS message is specified in 04.60, paragraph 11.2.17, and is shown in FIG. 4. In the parameter field description (04.60, paragraph 11.2.17, Table 80) it is said:

"Received PSI Message List (construction)

This construction contains a list of correctly received PSI messages. In this version of the protocol, the following message types may be indicated in this list:PSI2 (highest priority), PSI3, PSI3bis, PSI4, PSI5, PSI3ter, PSI6, PSI7 and PSI8 (lowest priority). The sender of this message may indicate as many messages in this list as can be fit into the message. Messages are listed by message type in descending order of priority. If there are more PSI messages than can be indicated in this list, the presence of additional message type(s) shall be indicated at the end of the list.

If the sender of this message has received a PSI message which is part of a consistent set of PSI messages (see 5.5.2.1.4), the Instance Bitmap may indicate which instances of this message type that have been received."

Still referring to FIG. 4, in the parameter field description (04.60, paragraph 11.2.17, Table 80) it is said:

"Received Unknown PSI Message List (construction)

This construction contains a list of message types that are received on PBCCH, which are not recognized as a PSI message type. In this version of the protocol, any message type except PSI1, PSI2, PS13, PSI3bis, PBI3ter, PSI4, PSI5, PSI6, PSI7 or PSI8 may be indicated in this list. The sender of this message may indicate as many messages in this list as can be fit into the message following the Received PSI Message List. Messages are listed by message type in the inverse order of reception, starting with the most recently received message type. If there are more messages than can be indicated in this list, the presence of additional message type(s) shall be indicated at the end of the list."

Those MSs 100 that support an earlier release must therefore first receive all PSI message types before they can indicate to the network 2 which PSI messages are recognized and those which are not. This can present a problem during the initial acquisition procedure after cell reselection.

R99, for example, introduces new optional PSI message types. The 04.60 protocol, however, states that the MS 100 shall understand and receive these messages, but not consider them relevant in deciding whether a consistent set of PSI messages have been received. A strict interpretation of the protocol specification is that R99 MSs 100 are not permitted to indicate the optional PSI messages as being unknown. Therefore, the MS 100 is not able to indicate to the network 2 which PSI message types are required by the MS 100 and which are not.

By way of summary of the problems inherent in the use of the PACKET PSI STATUS message as presently specified, the MS 100 is required to indicate all correctly received PSI messages in the PACKET PSI STATUS message. However, in an initiation initiated by receiving PSI1 (in which PBCCH_CHANGE_MARK increased by one, and then indicated by the value of the PSI_CHANGE_FIELD) there is no mechanism for informing the network 2 of which PSI messages the MS 100 is required to receive. The normal indication of which PSI messages the MS 100 has received and stored in the memory 130 is not sufficient, since the network 2 does not know when (or if) the MS 100 has decoded the PSI messages sent on the PACCH. In this regard it should be noted that there is a change mark field in the received PSI message structure, but the change mark field is only used (by the network 2) for checking which PSI messages were previously stored in the MS 100 (i.e., old PSI messages). It should be remembered that the MS 100 must receive at least one instance of each PSI message type.

In R99 and later networks there are optional PSI messages that R97, R98 and some R99 compatible MSs 100 do not require. Therefore, the network 2 is required to send all PSI messages in the packet data channel. This is a clear waste of spectrum and furthermore impedes data throughput. It should be noted that new optional PSI messages corresponding to new functionality and/or features of the R99 and later versions of the GPRS specifications have been and will in the future continue to be added, thereby only further compounding the problem. For earlier releases of GPRS MSs this presents a burden, especially in the packet transfer mode.

In accordance with the teachings of this invention, the MS 100 is enabled to implicitly indicate to the network 2 which PSI messages the MS 100 supports and requires during different PSI refresh situations, thereby reducing packet data channel usage to a minimum. The method in accordance with these teachings is applicable to all MSs 100 supporting GPRS and the use of the PACKET PSI STATUS message, including the first GPRS-compliant MSs (i.e., those compliant with ETSI Release 1997).

To accomplish this method the MS 100, for each PSI message that it supports and has not yet received, indicates according to the following rule, in a PACKET PSI STATUS message, the following:

In the Received PSI Message List (see FIG. 4)

MESSAGE_TYPE: a binary representation of the (not yet received) PSI message type; and PSIX_CHANGE_MARK: set to any value (is not valid in any case).

The MS 100 also includes the optional fields PSIX_COUNT and Instance Bitmap and sets them each to zero.

The PSIX_COUNT and Instance Bitmap indicate that the PSI message has one instance, and sets that instance as "not received". In this manner a minimum number of bits of the PACKET PSI STATUS message are used.

As defined herein, a PSI message that is supported by the MS 100 is one that the MS 100 is required to consider according to the specification that the MS 100 supports, and that is relevant when making a determination of whether or not a consistent set of system information messages have been received by the MS 100.

With regard to the PACKET PSI STATUS message, un/specified case, in a partial acquisition, i.e., an acquisition initiated by PSI1 (PBCCH_CHANGE_MARK increased by one followed by an examination of the PSI_CHANGE_FIELD), the MS 100 follows a second rule, in addition to the foregoing first rule, and includes, for each PSI message that it has completely received (i.e., a consistent set of that particular PSI message type has been received), the PSIX_COUNT and Instance Bitmap in the PSI message structure for that particular PSI message type, and sets the first instance of the PSI message type as "not received". Furthermore, if a PSI message type contains only one instance, this case corresponds directly to the first rule given above.

More specifically, the PACKET PSI STATUS message is sent by the MS 100 to indicate the present status of the PSI messages stored in the memory 130. For those PSI message types that the MS 100 considers relevant based on the features the MS 100 supports (non-GSM and multi-Radio Access Technology (multi-RAT) capabilities, for example), and recognizes based on the version of the GPRS specification according to which the MS 100 is implemented and, for the optional PSI message types, the broadcast of the message in the cell has been indicated by the network 2 in the PSI2 message, the MS 100 operates to indicate that the PSI message type has been received. This is valid also in the case that the PSI message type has not been received by the MS 100. This is indicated by the MS 100 by including the optional fields PSIX_COUNT and Instance_Bitmap, and setting their respective fields to zero for the particular PSI message type in the PACKET PSI STATUS message. In response, the network 2 determines that the MS 100 has not received the particular PSI message type, and disregards the indicated PSI_CHANGE_MARK in the PACKET PSI STATUS message.

In the multi-RAT case it is noted that the GPRS R99 specification provides new PSI3-series PSI messages (currently referred to as PSI3ter) for giving a description of possible 3G neighbor cells for reselection purposes. Also in this regard, existing PSI messages (e.g., PSI5) are extended to include certain 3G neighbor cell information and instructions to perform measurements of the 3G cells while receiving service in a 2G cell.

During the partial acquisition of PSI messages (04.60 paragraph 5.5.1.4) the MS 100 indicates, for each PSI message type that it requires to decode for checking the individual PSIx_CHANGE_MARK values, that at least one instance of that PSI message type has not been received. In the case that the PSI message type contains only one instance, the MS 100 indicates that the PSI message has not been received and fills the PACKET PSI STATUS message as specified.

In accordance with conventional practice, the PACKET PSI STATUS message is sent on the PACCH when the MS 100 is in packet transfer mode. The first sending of this message during the acquisition of PBCCH information takes place at the first suitable opportunity after the acquisition is initiated.

During the acquisition of PBCCH information the PACKET PSI STATUS message may be sent up to four times to the network 2. The second sending of the PACKET PSI STATUS message takes place at the first suitable opportunity at least one second after the message is sent the first time. Further transmissions of this message take place at the first suitable opportunity at least two seconds after the message was sent the previous time.

The PACKET PSI STATUS message is not sent when the MS 100 has started to suspend its TBF(s) in order to receive the required PSI messages on PBCCH. In addition, the PACKET PSI STATUS message is not when the MS 100 has acquired the complete set of PSI messages on PBCCH.

Advantages of the use of this method include the following. First, the method can be used without requiring a change to the currently specified radio interface between the MS 100 and the network 2. Second, by the use of this method unnecessary TBF suspensions are minimized due to the use of the same physical channel PACKET PSI STATUS message procedure for PSI updates (namely the ones indicated by PSI1) in the packet transfer mode. As was discussed above, TBF suspensions adversely impact the packet data throughput and may result in a complete halt of data transfer for the duration of the PSI message reception. Sending the PSI messages to the MS 100 in the packet transfer mode only "steals" those radio blocks within which the PSI messages are sent, as compared to the TBF suspension case, wherein additional radio blocks are missed due to channel configuration settling times and other delays. A third advantage of the use of this method is that all MSs 100, regardless of the protocol release that they support, are enabled to indicate to the network 2 which PSI messages they require. If the network 2 introduces new PSI messages, the network 2 has knowledge of which PSI message(s) to send to a particular MS 100, as each MS 100 is capable of expressly indicating which PSI messages it expects to receive. This increases the utilization of the radio channel bandwidth and resources, resulting in an increase in data throughput.

While the invention has been particularly shown and described with respect to preferred embodiments thereof, it will be understood by those skilled in the art that changes in form and details may be made therein without departing from the scope and spirit of the invention.

What is claimed is:

1. A method for operating a wireless communication system having packet data capabilities, comprising:
    sending a message from a mobile station to a network on a same physical channel that is used to transmit packet data, the message specifying individual ones of packet system information (PSI) messages that are required for reception by the mobile station; and
    in response to sending the message, receiving only the specified individual ones of the PSI messages from the network to the mobile station over the same physical channel used to transit the packet data, wherein the message is a PACKET PSI STATUS message and further wherein the PACKET PSI STATUS message includes fields PSIx_COUNT and Instance_Bitmap with their respective fields set to zero for a particular PSI message type in the PACKET PSI STATUS message.

2. A method for operating a wireless communication system having packet data capabilities, comprising:
    sending a message from a mobile station to a network on a same physical channel that is used to transmit packet data, the message specifying individual ones of packet system information (PSI) messages that are required for reception by the mobile station; and
    in response to sending the message, receiving only the specified individual ones of the PSI messages from the network to the mobile station over the same physical channel used to transit the packet data, wherein the message is a PACKET PSI STATUS message and further wherein the PACKET PSI STATUS message includes fields PSIx_COUNT and Instance_Bitmap with their respective fields set to zero for a particular PSI message type in the PACKET PSI STATUS message and further comprising:
    determining that the mobile station has not received the particular PSI message type, and
    disregarding an indicated PSI_CHANGE_MARK in the PACKET PSI STATUS message.

3. A method for operating a wireless communication network having packet data capabilities, comprising:
    receiving a message from a mobile station at the network on a same physical channel that is used to convey packet data, the message specifying individual ones of packet system information (PSI) messages that are required for reception by the mobile station; and
    in response to receiving the message, sending only the specified individual ones of the PSI messages from the network to the mobile station over the same physical channel used to transmit the packet data, wherein the message is a PACKET PSI STATUS message and further wherein the PACKET PSI STATUS message includes fields PSIx_COUNT and Instance_Bitmap with their respective fields set to zero for a particular PSI message type in the PACKET PSI STATUS message.

4. A method for operating a wireless communication network having packet data capabilities, comprising:
    receiving a message from a mobile station at the network on a same physical channel that is used to convey packet data, the message specifying individual ones of packet system information (PSI) messages that are required for reception by the mobile station; and
    in response to receiving the message, sending only the specified individual ones of the PSI messages from the network to the mobile station over the same physical channel used to transmit the packet data, wherein the message is a PACKET PSI STATUS message and further wherein the PACKET PSI STATUS message includes fields PSIx_COUNT and Instance_Bitmap with their respective fields set to zero for a particular PSI message type in the PACKET PSI STATUS message the method further comprising:
    determining that the mobile station has not received the particular PSI message type, and disregarding an indicated PSI_CHANGE_MARK in the PACKET PSI STATUS message.

5. A method for operating a wireless communication system having packet data capabilities, comprising:
    sending a PACKET PSI STATUS message from a mobile station to a network, the PACKET PSI STATUS message specifying individual ones of packet system information (PSI) message types that are required for reception by the mobile station; and
    in response to sending the PACKET PSI STATUS message, receiving the specified individual ones of the PSI message types from the network to the mobile station wherein the PACKET PSI STATUS message comprises message fields PSIx_COUNT and Instance_Bitmap with their respective fields set to zero for specifying to the network associated ones of PSI message types.

6. A method for operating a wireless communication system having packet data capabilities, comprising:
    sending a PACKET PSI STATUS message from a mobile station to a network, the PACKET PSI STATUS message specifying individual ones of packet system information (PSI) message types that are required for reception by the mobile station; and
    in response to sending the PACKET PSI STATUS message, receiving the specified individual ones of the PSI message types from the network to the mobile station wherein the PACKET PSI STATUS message comprises message fields PSIx_COUNT and Instance_Bitmap with their respective fields set to zero for specifying to the network associated ones of PSI message types, the method further comprising:
    determining that the mobile station has not received a particular PSI message type, and
    disregarding an indicated PSI_CHANGE_MARK in the PACKET PSI STATUS message.

7. A mobile station operable with a wireless communication network having packet data capabilities, the mobile station comprising an RF transceiver coupled to a data processor, said data processor configured to operate under the control of a stored program for:
- transmitting a PACKET PSI STATUS message from the mobile station to the network, the PACKET PSI STATUS message specifying individual ones of packet system information (PSI) message types that are desired for reception by said mobile station; and
- in response to transmitting said PACKET PSI STATUS message, receiving from said network at said mobile station only the specified individual ones of the PSI message types, wherein the PACKET PSI STATUS message includes fields PSIx_COUNT and Instance_Bitmap with their respective fields set to zero for specifying to said network associated ones of PSI message types.

8. A non-transitory computer-readable medium that stores a program of machine-readable instructions, the instructions being executable by a digital data processor, to perform actions comprising:
- sending a PACKET PSI STATUS message from a mobile station to a network, the PACKET PSI STATUS message specifying individual ones of packet system information (PSI) message types that are required for reception by the mobile station; and
- receiving the specified individual ones of the PSI message types from the network, wherein the PACKET PSI STATUS message comprises fields PSIx_COUNT and Instance_Bitmap with their respective fields set to zero for specifying to the network associated ones of PSI message types.

* * * * *